United States Patent
Carvalho et al.

(10) Patent No.: US 9,559,881 B2
(45) Date of Patent: Jan. 31, 2017

(54) TRANSCEIVER SYSTEM WITH REDUCED LATENCY UNCERTAINTY

(75) Inventors: Neville Carvalho, Campbell, CA (US); Allan Thomas Davidson, San Jose, CA (US); Andy Turudic, Hillsboro, OR (US); Bruce B. Pedersen, Sunnyvale, CA (US); David W. Mendel, Sunnyvale, CA (US); Kalyan Kankipati, San Jose, CA (US); Michael Menghui Zheng, Fremont, CA (US); Sergey Shumarayev, Los Altos Hills, CA (US); Seungmyon Park, Sunnyvale, CA (US); Tim Tri Hoang, San Jose, CA (US); Kumara Tharmalingam, San Jose, CA (US)

(73) Assignee: Altera Corporation, San Jose, CA (US)

( * ) Notice: Subject to any disclaimer, the term of this patent is extended or adjusted under 35 U.S.C. 154(b) by 1687 days.

(21) Appl. No.: 12/283,652

(22) Filed: Sep. 15, 2008

(65) Prior Publication Data

US 2009/0161738 A1 Jun. 25, 2009

Related U.S. Application Data

(60) Provisional application No. 61/009,012, filed on Dec. 21, 2007.

(51) Int. Cl.
*H04L 7/00* (2006.01)
*H04B 1/38* (2015.01)
*H04L 25/14* (2006.01)

(52) U.S. Cl.
CPC ..................................... *H04L 25/14* (2013.01)

(58) Field of Classification Search
CPC .......... H03M 9/00; H04J 3/0685; H04J 3/062; H04L 7/0337; G06F 1/10
See application file for complete search history.

(56) References Cited

U.S. PATENT DOCUMENTS 5,260,979 A * 11/1993 Parker et al. ................. 375/366
6,744,323 B1 * 6/2004 Moyal et al. ................ 331/1 A
(Continued)

OTHER PUBLICATIONS

U.S. Appl. No. 11/956,260, filed Dec. 13, 2007, Turudic.
Texas Instruments, "TLK2701 1.6 to 2.7 GBPS Transceiver," Aug. 2000, Revised Mar. 2008, pp. 1-19 and addendums (6 pages).

*Primary Examiner* — Aristocratis Fotakis

(57) ABSTRACT

A transceiver system with reduced latency uncertainty is described. In one implementation, the transceiver system has a word aligner latency uncertainty of zero. In another implementation, the transceiver system has a receiver-to-transmitter transfer latency uncertainty of zero. In yet another implementation, the transceiver system has a word aligner latency uncertainty of zero and a receiver-to-transmitter transfer latency uncertainty of zero. In one specific implementation, the receiver-to-transmitter transfer latency uncertainty is eliminated by using the transmitter parallel clock as a feedback signal in the transmitter phase locked loop (PLL). In one implementation, this is achieved by optionally making the transmitter divider, which generates the transmitter parallel clock, part of the feedback path of the transmitter PLL. In one implementation, the word aligner latency uncertainty is eliminated by using a bit slipper to slip bits in such a way so that the total delay due to the word alignment and bit slipping is constant for all phases of the recovered clock. This allows for having a fixed and known latency between the receipt and transmission of bits for all phases of parallelization by the deserializer. In one specific implementation, the total delay due to the bit shifting by the word aligner and the bit slipping by the bit slipper is zero since the bit slipper slips bits so as to compensate for the bit shifting that was performed by the word aligner.

33 Claims, 9 Drawing Sheets

(56) References Cited

U.S. PATENT DOCUMENTS

| | | | |
|---|---|---|---|
| 7,039,787 B1* | 5/2006 | Venkata | H04J 3/0608 |
| | | | 341/101 |
| 7,346,794 B1* | 3/2008 | Davidson et al. | 713/400 |
| 7,715,467 B1* | 5/2010 | Burney | 375/219 |
| 7,913,104 B1* | 3/2011 | Cory et al. | 713/503 |
| 2005/0129158 A1* | 6/2005 | Kuwata | 375/376 |
| 2005/0286507 A1* | 12/2005 | sterling et al. | 370/363 |
| 2006/0095613 A1* | 5/2006 | Venkata et al. | 710/62 |
| 2006/0233172 A1* | 10/2006 | Venkata et al. | 370/391 |
| 2007/0195916 A1* | 8/2007 | Itahara | 375/376 |

* cited by examiner

L = Fixed bit-level latency between D0 input to the device to D0 leaving the device for both phase 0 and phase 1

TRANSCEIVER SYSTEM WITH REDUCED LATENCY UNCERTAINTY

CROSS-REFERENCE TO RELATED APPLICATIONS

This application claims the benefit of U.S. Provisional Application No. 61/009,012 of Neville Carvalho et al., filed on Dec. 21, 2007 and entitled "Transceiver System With Reduced Latency Uncertainty", which is incorporated herein by reference.

BACKGROUND

The present invention relates to latency uncertainty reduction.

FIG. 1 is a block diagram of a system with latency uncertainty. In FIG. 1, system 100, includes receiver 110, word aligner 120, user logic 130, phase crossing first-in-first-out (FIFO) 150, and transmitter 160. A receiver and a transmitter may herein be designated as RX and TX, respectively. The combination of a receiver and a transmitter may herein be referred to as a transceiver. In addition to referring to a combination of a receiver and a transmitter, a transceiver may also herein be used to refer to a receiver or a transmitter. As system 100 includes a transceiver, it may herein be referred to as a transceiver system. System 100 may also herein be referred to as a device, more specifically a transceiver device, i.e., a device that includes a transceiver. The terms transceiver system and transceiver device (in addition to being used to refer to a system or device having a transceiver) may also herein be used to refer to a transceiver.

System 100 may be a programmable logic device (PLD). However, system 100 is not limited to being a PLD, but may be any circuit or device. In the example of system 100, word aligner 120, user logic 130, and phase crossing FIFO 150 are part of the PLD core, which may also be referred to as the PLD fabric.

Receiver 110 includes input interface (I/F) 111, clock data recovery (CDR) unit 112, deserializer 113 which converts serial data to parallel data, and divider 116. Deserializer 113 includes serial register 114 operating with a serial clock and a parallel register 115 operating with a parallel clock, which may also herein be referred to as a recovered clock or a receiver parallel clock. CDR unit 112 receives input data and recovers a serial input clock therefrom. CDR unit 112 provides the input data to deserializer 113 and the serial input clock to divider 116. Divider 116 is an N divider that divides the serial input clock by N to provide the receiver parallel clock, where N is an integer that represents the number of bits per cycle of the receiver parallel clock and may herein be referred to as the deserialization factor. In one example, N is equal to 10, but may be equal to any integer greater than 1.

Divider 116 can produce a recovered clock that has any of N phases. FIG. 2 illustrates different phases of the recovered clock relative to the serial clock and serial incoming data stream of FIG. 1. In FIG. 2, the serial incoming data stream and serial clock are respectively represented by signals 210 and 220. Similarly, parallel clocks with phases 0, 1, 2, 3, 4, and 9 are respectively represented by signals 230, 231, 232, 233, 234, and 239. In FIG. 2, N is assumed to be 10, and therefore, there are 10 different phases of the recovered clock, which are numbered phases 0 through 9. These 10 phases produce 10 different word orderings out of deserializer 113. In the example of FIG. 2, phase 0 produces 10-bit parallel words which at cycle 0 include bits D9, D8, D7, D6, D5, D4, D3, D2, D1, and D0 and at cycle 1 include bits D19, D18, D17, D16, D15, D14, D13, D12, D1, and D10; phase 1 produces 10-bit parallel words which at cycle 0 include bits D0,X,X,X,X,X,X,X. and X (where X indicates a do not care bit) and at cycle 1 include bits D10, D9, D8, D7, D6, D5, D4, D3, D2, and D1; phase 2 produces 10-bit parallel words which at cycle 0 include bits D1, D0, X, X, X, X, X, X, X, and X and at cycle 1 include bits D11, D10, D9, D8, D7, D6, D5, D4, D3, and D2; and phase 9 produces 10-bit parallel words which at cycle 0 include bits D8, D7, D6, D5, D4, D3, D2, D1, D0, and X and at cycle 1 include bits D18, D17, D16, D15, D14, D13, D12, D11, D10, and D9. It is to be noted that for each of phases 0 to 9, cycle 0 is the first cycle which includes bit D0 and cycle 1 is the cycle immediately after cycle 0.

Referring back to FIG. 1, word aligner 120 receives parallel words from receiver 110 and aligns the parallel words to a desired word boundary. Word aligner 120 also receives the recovered clock. In the example of FIG. 1, word aligner 120 is implemented in the programmable logic fabric of the PLD. The word alignment performed by word aligner 120 is needed in situations where user designs operate on the parallel data expecting certain predefined words (e.g., comma characters like K28.5). In such situations, user logic 130 would properly process the parallel data only when it is aligned to a desired word boundary. The process of word alignment to the desired word introduces a Deserializer/Word aligner latency uncertainty. For example, if the desired predefined word was in fact "D9-D0", then in the phase 0 case, no alignment is needed; in the phase 1 case, an alignment of 1 bits is needed, which introduces an uncertainty of 1 bit period or unit internal (UI); in the phase 2 case, an alignment of 2 bits is needed, which introduces an uncertainty of 2 bit periods; and in the phase 9 case, an alignment of 9 bits is needed, which introduces an uncertainty of 9 bit periods. Thus, the word alignment process introduces a bit level uncertainty of up to N−1 bit periods, where N is the deserialization factor.

User logic 130 receives aligned words from word aligner 120 and the recovered clock from receiver 110. User logic 130 processes the aligned words and provides the processed data to phase crossing FIFO 150, which also receives the recovered clock from receiver 110 and a transmitter parallel clock from transmitter 160. Phase crossing FIFO 150 receives data on the recovered clock and outputs data on the transmitter parallel clock. The recovered clock and the transmitter parallel clock have the same frequency, but an unknown phase difference. As a result, there is an uncertainty of one clock cycle between the recovered clock and the transmitter parallel clock. This is described in further detail below.

Transmitter 160 includes output I/F 161, serializer 163 which converts parallel data to serial data, divider 166 (which may herein be referred to as transmitter divider 166), and phase locked loop (PLL) 170 (which may herein be referred to as transmitter PLL 170). Serializer 163 includes serial register 164 operating on a serial output clock and a parallel register 165 operating on the transmitter parallel clock, which may also herein be referred to as a parallel transmitter clock or parallel output clock. Divider 166 is an N divider that divides the serial output clock by N to provide the transmitter parallel clock, where N is as defined above. PLL 170 includes phase frequency detector (PFD) 172, voltage controlled oscillator (VCO) 174, and divider 176 connected as shown in FIG. 1. As can be seen in FIG. 1, divider 176 (an M divider) is a feedback path divider that divides the output of VCO 174 by a factor of M, where M is an integer representing the ratio between the frequency of the signal output by VCO 174 and the frequency of the recovered clock received by PFD 172. PLL 170 receives the recovered clock as a reference signal and outputs a serial output clock signal whose frequency is M times that of the recovered clock signal. PFD 172 ensures that both clock signals that it receives (recovered clock signal and the output of divider 176) have the same frequency and are in phase with each other by making VCO 174 increase or decrease the frequency of its output as necessary. In the example shown in FIG. 1, M is equal to N and therefore, the serial output clock signal has a frequency that is N times that of the recovered clock signal. In other words, the serial output clock signal has a frequency that is equal to the serial input clock frequency. Divider 166, which is an N divider, divides the serial output clock signal by N to produce the transmitter parallel clock signal. Thus, the transmitter parallel clock signal has the same frequency as the recovered clock signal.

Table 1 below illustrates the relation between the serial data rate and latency uncertainty for a system such as system 100, in a case where N is equal to 10.

TABLE 1

| Serial Data Rate (in mega bits per second (Mbps)) | Parallel Clock Frequency (in mega Hz (MHz)) | Deserializer/Word Aligner Latency Uncertainty (0.9 cycle) (in nano seconds (ns)) | RX/TX Transfer Latency Uncertainty (1 cycle) (in ns) | Total Latency Uncertainty (in ns) |
|---|---|---|---|---|
| 614 | 61.4 | 14.65 | 16.28 | 30.93 |
| 1228 | 122.8 | 7.32 | 8.14 | 15.46 |
| 2456 | 245.6 | 3.66 | 4.07 | 7.73 |

In Table 1, serial data rates of 614 Mbps (mega bits per second), 1228 Mbps, and 2456 Mbps are chosen as examples. As can be seen in Table 1, system 100 involves both a deserializer/word aligner latency uncertainty (which may herein be referred to as a word aligner latency uncertainty), a receiver/transmitter transfer latency uncertainty (which may herein be referred to as receiver-to-transmitter transfer latency uncertainty or transfer latency uncertainty), and a total latency uncertainty that is the sum of the word aligner latency uncertainty and the transfer latency uncertainty.

Certain protocols mandate a bit-level latency uncertainty that is in the order of nanoseconds. One such protocol is the Common Public Radio Interface (CPRI) protocol which mandates a maximum bit-level latency uncertainty of 16.3 ns across a serial link. Thus, in some cases, it is desirable to reduce the latency uncertainty of a system.

SUMMARY

The present invention allows for eliminating both the receiver-to-transmitter transfer latency uncertainty and the word aligner latency uncertainty. It also allows for eliminating one, but not the other, of these two latency uncertainties.

In one embodiment, the present invention includes a transceiver system whose receiver-to-transmitter transfer latency uncertainty is zero. In another embodiment, the present invention includes a transceiver system whose word aligner latency uncertainty is zero. In yet another embodiment, the present invention includes a transceiver system whose receiver-to-transmitter transfer latency uncertainty and word aligner latency uncertainty are both zero.

In one embodiment, the receiver-to-transmitter transfer latency uncertainty is eliminated by using the transmitter parallel clock as a feedback signal in the transmitter PLL. In one implementation, this is achieved by optionally making the transmitter divider, which generates the transmitter parallel clock, part of the feedback path of the transmitter PLL.

In one embodiment, the word aligner latency uncertainty is eliminated by using a bit slipper to slip bits in such a way so that the total delay due to the word alignment and bit slipping is constant for all phases of the recovered clock. This allows for having a fixed and known latency between the receipt and transmission of bits for all phases of parallelization by the deserializer. In one specific implementation, the total delay due to the bit shifting by the word aligner and the bit slipping by the bit slipper is zero since the bit slipper slips bits so as to compensate for the bit shifting that was performed by the word aligner.

BRIEF DESCRIPTION OF THE DRAWINGS

The novel features of the invention are set forth in the appended claims. However, for purpose of explanation, several aspects of particular embodiments of the invention are described by reference to the following figures.

DETAILED DESCRIPTION

The following description is presented to enable any person skilled in the art to make and use the invention, and is provided in the context of particular applications and their requirements. Various modifications to the exemplary embodiments will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 3:
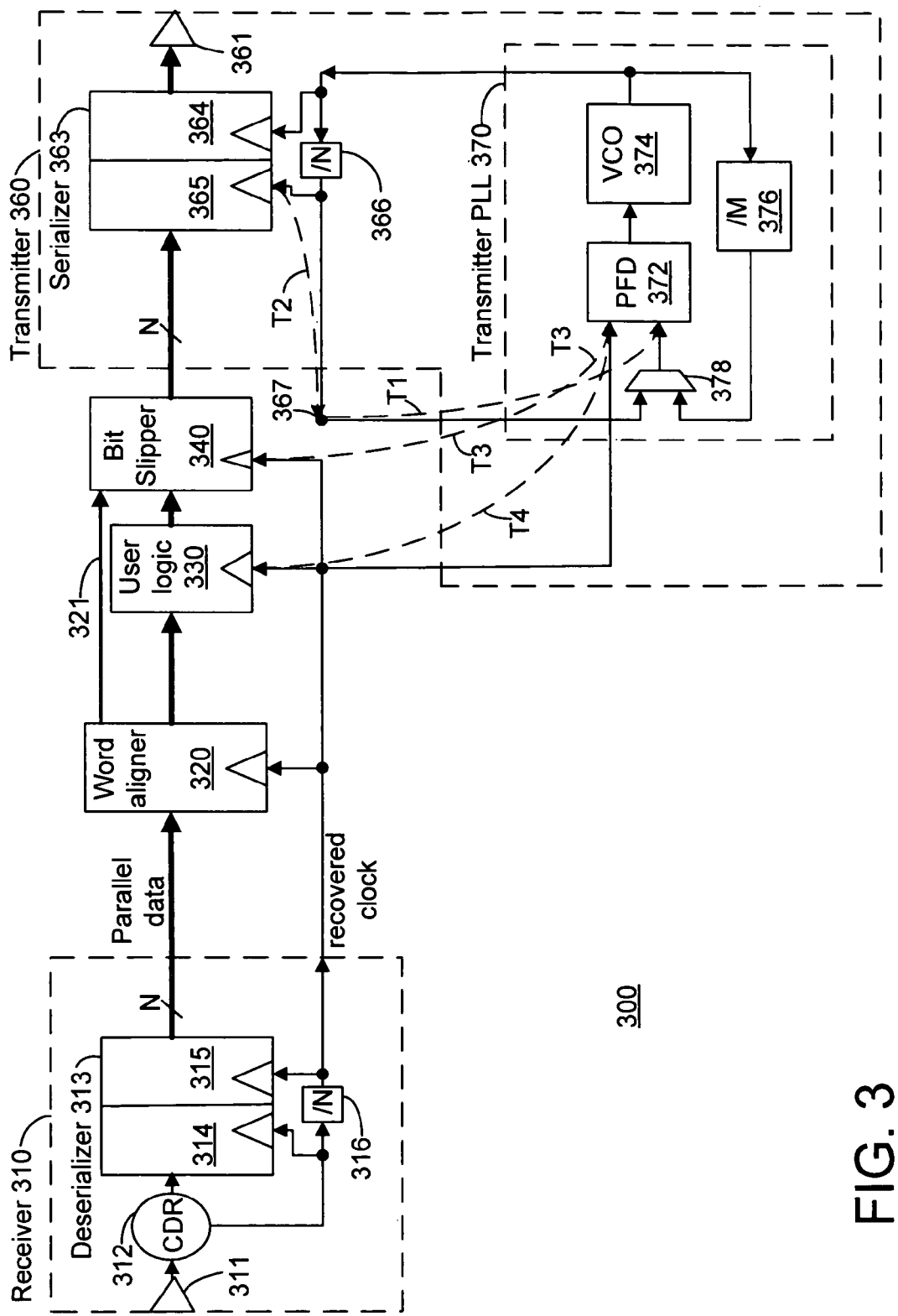
FIG. 3 is a block diagram of an embodiment of the system of the present invention.

FIG. 3 is a block diagram of an embodiment of the system of the present invention. In FIG. 3, system 300 includes receiver 310, word aligner 320, user logic 330, bit slipper 340, and transmitter 360. System 300 may be a PLD or any other circuit or device that includes a user logic, a receiver, and a transmitter. In one embodiment of system 300, word aligner 320, user logic 330, and bit slipper 340 are part of the PLD core. In one embodiment, system 300 is a single-lane transceiver system.

Receiver 310 includes input I/F 311, CDR unit 312, deserializer 313 and divider 316. Deserializer 313 converts serial data to parallel data and includes serial register 314 operating with a serial clock and a parallel register 315 operating with a parallel clock, which may also herein be referred to as a recovered clock or receiver parallel clock. CDR unit 312 receives input data and recovers a serial input clock therefrom. CDR unit 312 provides the input data to deserializer 313 and the serial input clock to both deserializer 313 and divider 316. Divider 316 is an N divider that divides the serial input clock by N to provide the receiver parallel clock. In one embodiment, N is equal to 10, but may be equal to any integer greater than 1. Receiver 310 outputs an N bit wide parallel data and the recovered clock.

Word aligner 320 receives parallel words from receiver 310 and aligns the parallel words to a desired word boundary. Word aligner 320 also receives the recovered clock. Word aligner 320 is similar to word aligner 120 shown in FIG. 1 and operates in a manner similar to word aligner 120 to align the words it receives such that they are aligned with a word boundary expected by user logic 330. In the example of FIG. 3, word aligner is implemented in the programmable logic fabric of the PLD. As explained in relation to word aligner 120, the process of word alignment introduces a word aligner latency uncertainty, which is a bit-level uncertainty of up to N−1 bit periods, where N is the deserialization factor.

In one embodiment, as shown in FIG. 3, word aligner 320 provides a signal 321 to bit slipper 340. This is explained in greater detail below.

User logic 330 receives aligned words from word aligner 320 and the recovered clock from receiver 310. User logic 330 processes the aligned words and provides the processed data to bit slipper 340, which also receives the recovered clock from receiver 310. It is to be noted that, in system 300, user logic 330 is where the main processing of parallel words occurs.

Bit slipper 340 is an N-bit slipper that receives N-bit parallel words, slips bits of those words by up to N bits, and outputs N-bit parallel words. Bit slipper 340 receives signal 321 from word aligner 320. As can be seen in FIG. 3, signal 321 bypasses user logic 330. In one embodiment, signal 321 represents B, where B is an integer greater than or equal to 0 and indicates the number of bits by which word aligner 320 shifted bits in the parallel data to achieve the desired word boundary. In another embodiment, signal 321 represents N−1−B, where N and B are as defined above. Bit slipper 340 shifts bits in its input data such that the total bit shifting caused by the word aligner and bit slipper is constant for all phases of the recovered clock. In one embodiment, bit slipper 340 effectively shifts bits in its input data to compensate for the bit shift caused by word aligner 320, which causes the total bit shifting by the word aligner and the bit slipper to be zero for all phases of the recovered clock. As a result of the bit slipping caused by bit slipper 340, assuming there is no other latency uncertainty (e.g., there is no receiver-to-transmitter latency uncertainty), each bit in the output serial stream has a fixed and known timing relationship with respect to its corresponding bit in the input stream for all phases of the deserializer, i.e., all phases of the recovered clock. In other words, there is a fixed and known bit-level latency between the input and output serial data stream. It is assumed that other latency uncertainties (e.g., wire latency uncertainty) are insignificant and are therefore ignored. A more detailed description of bit slipper 340 and its function is provided below in relation to FIGS. 4 and 5.

Use of bit slipper 340 allows for removing the word aligner latency uncertainty. A word aligner latency that is known may also be referred to as a deterministic word aligner latency. In another embodiment, system 300 may be modified so as not to include bit slipper 340. In such an embodiment, word aligner would not send a signal 321. It is to be noted that even without use of a bit slipper, system 300 would reduce latency uncertainty as explained below.

Transmitter 360 includes output I/F 361, serializer 363 which converts parallel data to serial data, divider 366 (which may herein be referred to as transmitter divider 366), and PLL 370 (which may herein be referred to as transmitter PLL 370). Serializer 363 includes serial register 364 operating on a serial output clock and a parallel register 365 operating on a parallel output clock, which may also herein be referred to as a transmit parallel clock. Divider 366 is an N divider that divides the serial output clock by N to provide the parallel output clock, where N is as defined above.

PLL 370 includes PFD 372, VCO 374, divider 376, and multiplexer 378, which are connected as shown in FIG. 3. In one embodiment, divider 376 is an M divider where M is as defined above. Multiplexer 378 is a 2-to-1 multiplexer that receives the output of divider 366 and the output of divider 376 and selects one of them to provide to PFD 372. In the above description, PLL 370 is defined as including multiplexer 378. Alternatively, PLL 370 may be defined as including PFD 372, VCO 374, and divider 376, but not multiplexer 378. In such a case, multiplexer 378 would be considered to be connected to PLL 370, rather than being included in PLL 370.

PLL 370, more specifically PFD 372 of PLL 370, receives a delayed version of the recovered clock as a reference signal. PFD 372 also receives the output of multiplexer 378, which it compares against the reference signal. When system 300 operates in deterministic latency mode, more specifically when it operates to eliminate receiver-to-transmitter transfer latency uncertainty, then multiplexer 378 selects the input it receives from divider 366 as an output to provide to PFD 372. In such a case, the feedback path for the PLL is from VCO 374 to PFD 372 by way of divider 366 and multiplexer 378, which may herein be referred to as the new feedback path.

Figure 1:
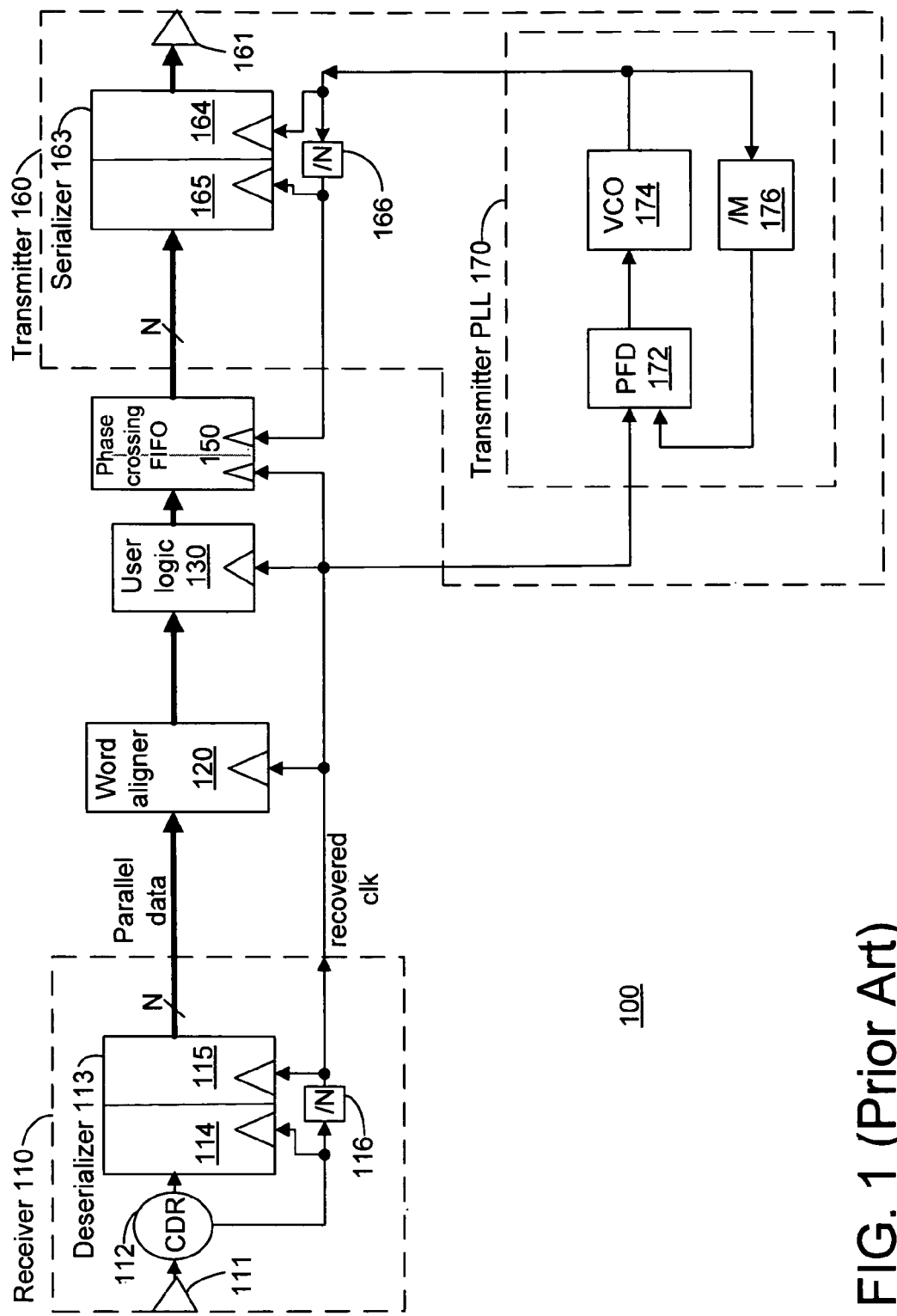
FIG. 1 is a block diagram of a system with latency uncertainty.
Figure 2:
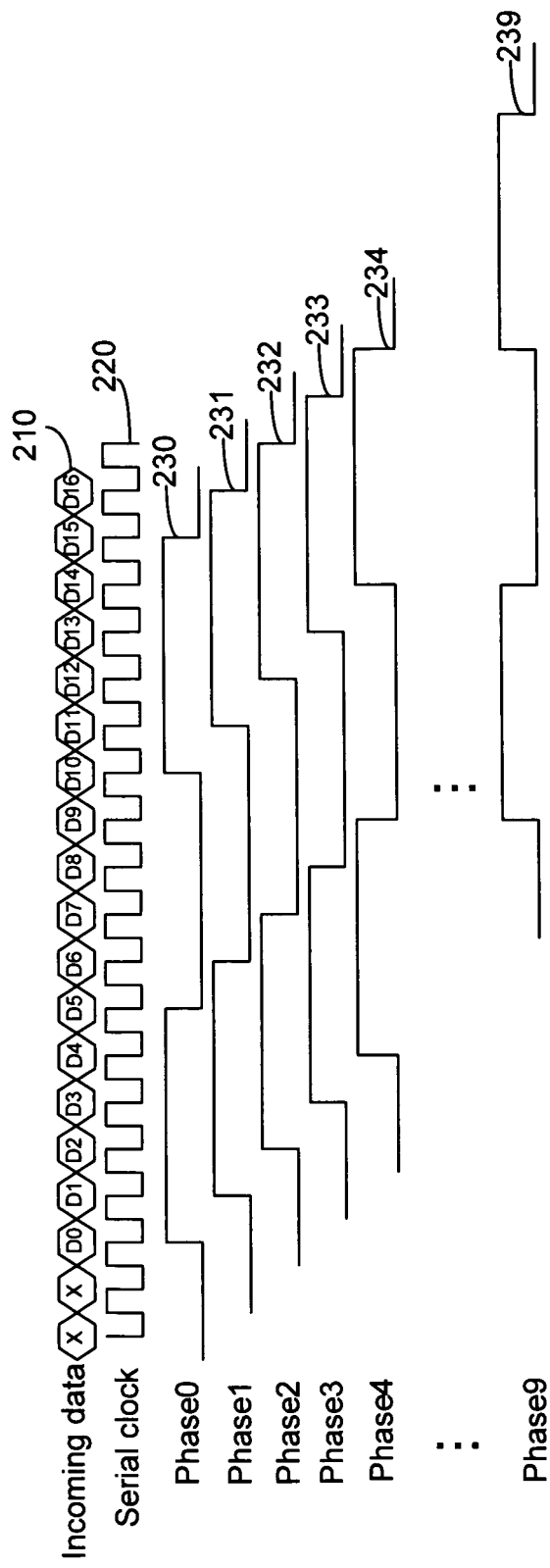
FIG. 2 illustrates different phases of the recovered clock relative to the serial clock and serial incoming data stream of FIG. 1.

As explained in greater detail below, use of this new feedback path allows for eliminating the receiver-to-transmitter transfer latency uncertainty and for avoiding use of a phase crossing FIFO such as that used in system 100 of FIG. 1. In other words, by optionally allowing divider 366, the transmitter divider, to be a part of the feedback loop of transmitter PLL 370, the receiver-to-transmitter transfer latency uncertainty is completely removed and data can be transferred from user logic 330 and bit slipper 340 to transmitter 360, more specifically serializer 363, without the need for a phase crossing FIFO.

When using the new feedback path, PLL 370 locks a delayed version of the transmitter parallel clock with a reference clock. As noted above, the transmitter parallel clock is the parallel clock used in serializer 363, more specifically parallel register 364 of serializer 363. As shown in FIG. 3, the delay between the parallel clock input into serializer 363 and the clock signal at node 367 is T2, while the delay between the clock signal at node 367 and the signal against which the recovered clock is compared by PFD 372 is T1. Therefore, the total delay between the parallel clock input into serializer 363 (i.e., the transmitter parallel clock) and the signal against which the reference signal is compared by PFD 372 is T1+T2. As noted above, the reference signal is a delayed version of the recovered clock signal. As can be seen in FIG. 3, the reference signal has a delay of T3 relative to the recovered clock signal input into bit slipper 340 and a delay of T4 relative to the recovered clock signal input into user logic 330. As PLL 370 locks a reference signal (which has a known delay relative to the recovered clock) with the signal received from multiplexer 378 (which, when the new feedback path is used, has a delay of T1+T2 relative to the parallel clock input into serializer 363, i.e., the transmitter parallel clock), the reference signal is delayed with respect to the transmitter parallel clock by T1+T2. Additionally, the delay between the reference signal and the delayed version of the recovered clock used in different components is also known. Therefore, the delay between the transmitter parallel clock and the recovered clock is known for components that receive these clock signals. For example, in the example of FIG. 3, the delay (or clock skew) between the recovered clock input into bit slipper 340 and the transmitter parallel clock input into serializer 363 is T3−(T1+T2). As the latency between the parallel clocks used in the receiver and transmitter, as well as components between the receiver and transmitter (e.g., bit slipper 340) is known, the receiver-to-transmitter latency is not uncertain. As the receiver-to-transmitter transfer latency is known, there is deterministic receiver-to-transmitter transfer latency. In other words, the receiver-to-transmitter transfer latency uncertainty is zero. In system 300, this latency is a bit-level latency.

When system 300 does not operate to eliminate the receiver-to-transmitter transfer latency uncertainty, multiplexer 378 selects the input it receives from divider 376 as an output to provide to PFD 372. In such a case, the feedback path for the PLL is from VCO 374 to PFD 372 by way of divider 376 and multiplexer 378, which may herein be referred to as the old feedback path. This is effectively the same feedback path as that of PLL 170 in FIG. 1. Although not shown in FIG. 3, when using the old feedback path, a reference clock other than the recovered clock may be used in PLL 370.

In one embodiment of the invention, when using a bit slipper to eliminate the word aligner latency uncertainty, one may choose not to eliminate the receiver-to-transmitter transfer uncertainty. In such a case, the new feedback path would not be used. Instead, the old feedback loop would be used, in which case, a phase crossing FIFO may be used to allow for transferring from the receiver parallel clock to the transmitter parallel clock.

In another embodiment of the invention, when using the new feedback path to eliminate the receiver-to-transmitter transfer latency uncertainty, one may choose not to eliminate the word aligner latency uncertainty. In such a case, a bit slipper would not be used.

A system, such as system 300, for which both the receiver-to-transmitter latency and the word aligner latency are known, may be referred to as a system with deterministic latency. In the case of system 300, the known latency is a known bit-level latency and, accordingly, system 300 is a system with deterministic bit-level latency. Moreover, in one embodiment, system 300 is a high-speed serial transceiver PLD, and, therefore, in such an embodiment, system 300 is a system with deterministic bit-level latency through a high-speed serial transceiver PLD. As the latency in system 300 is known, system 300 has zero latency uncertainty. Also, as the latency at issue in system 300 is a bit-level latency, system 300 has zero bit-level latency uncertainty.

Figure 4:
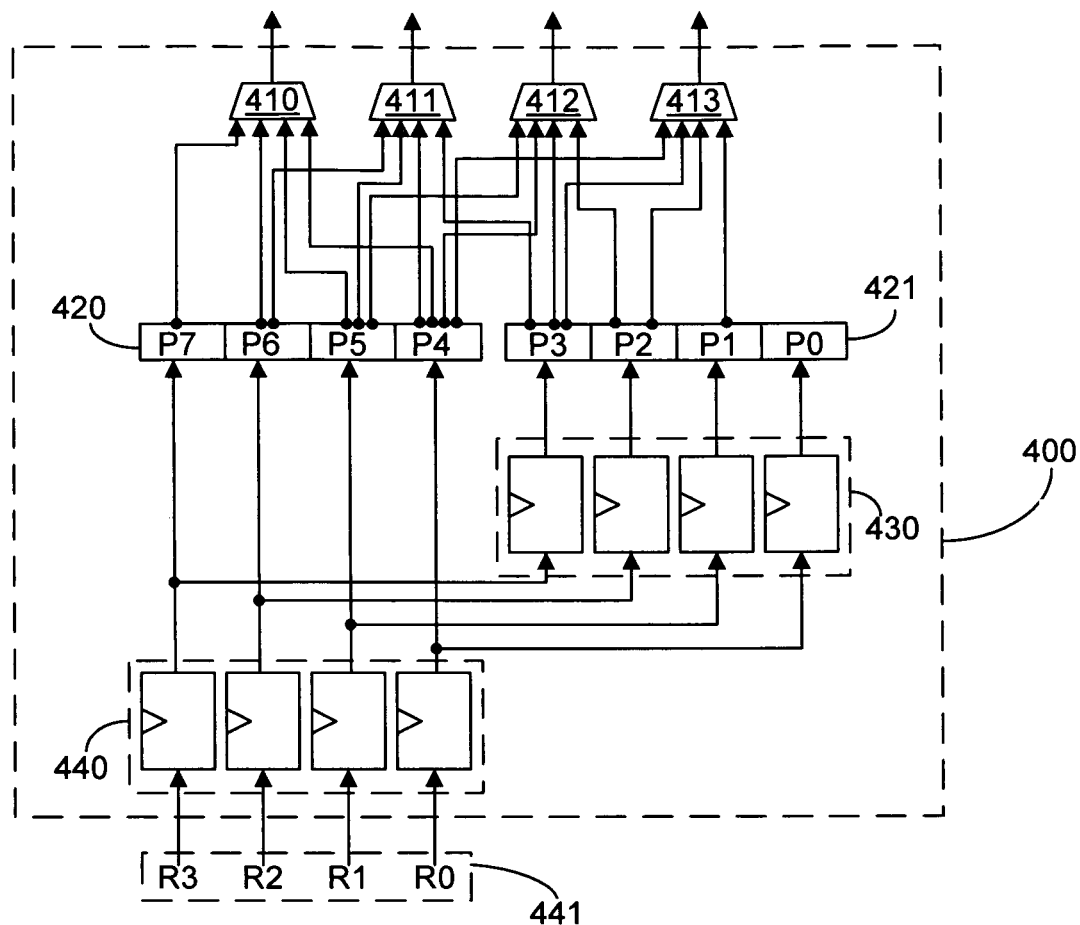
FIG. 4 illustrates one embodiment of a bit slipper that can be used in the present invention.

FIG. 4 illustrates one embodiment of a bit slipper that can be used in the present invention. In FIG. 4, bit slipper 400 includes multiplexers 410, 411, 412, and 413, registers 430 and registers 440. Registers 440 receive word 441, which includes bits R0, R1, R2, and R3, and delay word 441 by one clock cycle to output word 420, which includes bits P4, P5, P6, and P7. Registers 430 delay word 420 to output word 421, which includes bits P0, P1, P2, and P3. Thus if we assume that word 421 is received on the current cycle, then word 420 is received one cycle before the current cycle and word 441 is received two cycles before the current cycle.

Multiplexers 410 to 413 receive bits of words 420 and 421, as shown. Each of multiplexers 410 to 413 is a 4-to-1 multiplexer, and, as indicated above, each of words 420 and 421 is a 4-bit word. Multiplexers 410 to 413 collectively output a 4-bit word with multiplexers 410 and 413 outputting the most significant bit (MSB) and the least significant bit (LSB) of the 4-bit word, respectively.

In one embodiment, all of multiplexers 410 to 413 receive the same select signal. In one such embodiment, when the select signal is equal to 0, multiplexers 410 to 413 respectively select bits P7, P6, P5, and P4 for outputting; when the select signal is equal to 1, multiplexers 410 to 413 respectively select bits P6, P5, P4, and P3 for outputting; when the select signal is equal to 2, multiplexers 410 to 413 respectively select bits P5, P4, P3, and P2 for outputting, and when the select signal is equal to 3, multiplexers 410 to 413 respectively select bits P4, P3, P2, and P1 for outputting. Thus, when the select signal is equal to 0, there is no bit slipping; when the select signal is 1, there is a bit slipping of one bit; when the select signal is 2, there is a bit slipping of two bits, and when the select signal is 3, there is a bit slipping of three bits. In this embodiment, the value of the select signal is equal to N−1−B, where N and B are as defined above and where N is equal to 4 for a 4-bit bit slipper. The value of B depends on which phase was used in the deserializer for creating the parallel words. In the above embodiment, for a 4-bit word, for phases 0 to 3, the values of B are 0 to 3, respectively. Also in this embodiment, signal 321 (shown in FIG. 3) is equal to N−1−B and is used as the control signal by bit slipper 400. In the above embodiment, the bit slipper effectively delays the bits in time by N−1−B bits, i.e., it causes bits to be output N−1−B bits later in time. As used herein delaying a bit in time means if the bit were originally to be output at time T, with the delay in time it would occur at a later time T+TD, where TD represent the amount of time by which the bit was delayed in time. It is to be noted that the bits were delayed in time by the word aligner by B bits. Thus, the total delay in time due to the word aligner and the bit slipper is equal to the sum of the above two delays, namely N−1. It is to be noted that a total delay of N−1 bits is achieved by the word aligner and the bit slipper for all phases of converting serial data to parallel data by the deserializer, as the total delay N−1 is independent of the phase.

Figure 5:
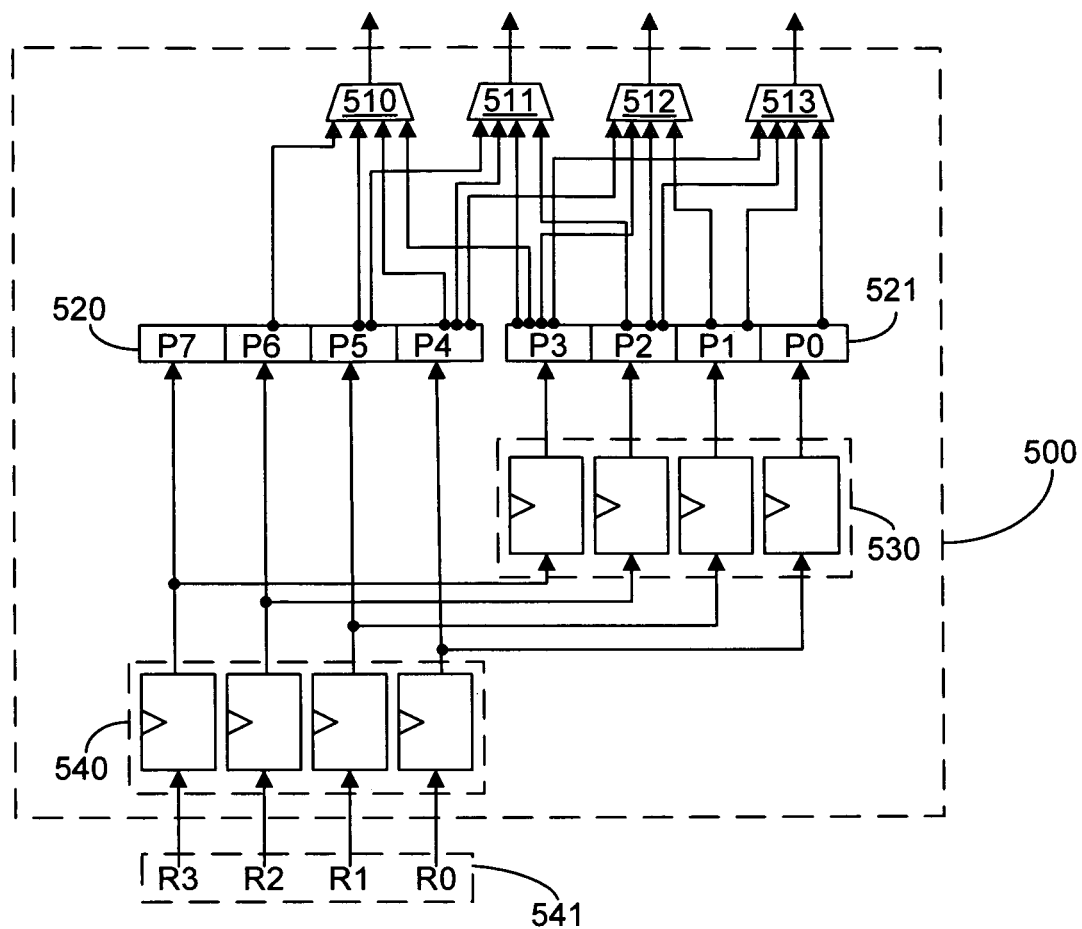
FIG. 5 illustrates another embodiment of a bit slipper that can be used in the present invention.

FIG. 5 illustrates another embodiment of a bit slipper that can be used in the present invention. In FIG. 5, bit slipper 500 includes multiplexers 510, 511, 512, and 513, registers 530 and registers 540. Registers 540 receive word 541, which includes bits R0, R1, R2, and R3, and delay word 541 by one clock cycle to output word 520, which includes bits P4, P5, P6, and P7. Registers 530 delay word 520 to output word 521, which includes bits P0, P1, P2, and P3'. Thus if we assume that word 521 is received on the current cycle, then word 520 is received one cycle before the current cycle and word 541 is received two cycles before the current cycle.

Multiplexers 510 to 513 receive bits of words 520 and 521, as shown. Each of multiplexers 510 to 513 is a 4-to-1 multiplexer, and, as indicated above, each of words 520 and

521 is a 4-bit word. Multiplexers 510 to 513 collectively output a 4-bit word with multiplexers 510 and 513 outputting the most significant bit (MSB) and least significant bit (LSB) of the 4-bit word, respectively.

In one embodiment, all of multiplexers 510 to 513 receive the same select signal. In one such embodiment, when the select signal is equal to 0, multiplexers 510 to 513 respectively select bits P3, P2, P1, and P0 for outputting; when the select signal is equal to 1, multiplexers 510 to 513 respectively select bits P4, P3, P2, and P1 for outputting; when the select signal is equal to 2, multiplexers 510 to 513 respectively select bits P5, P4, P3, and P2 for outputting, and when the select signal is equal to 3, multiplexers 510 to 513 respectively select bits P6, P5, P4, and P3 for outputting. Thus, when the select signal is equal to 0, there is a bit slipping of zero bits; when the select signal is 1, there is a bit slipping of one bit; when the select signal is 2, there is a bit slipping of two bits, and when the select signal is 3, there is a bit slipping of three bits. In the above embodiment, the value of the select signal is equal to the number of bits by which words were shifted by the word aligner. Signal 321 (shown in FIG. 3) that is sent by the word aligner to the bit slipper indicates this information. In the above embodiment, signal 321 is equal to B, the number of bits by which the word aligner shifted bits of a word to achieve the desired word boundary, and is used as the control signal by bit slipper 500. The value of B depends on which phase was used in the deserializer for creating the parallel words. In this embodiment of a bit slipper, for a 4-bit word, for phases 0 to 3, the values of B are 0 to 3, respectively. In the above embodiment, the bit slipper effectively shifts the bits backwards in time by B bits, i.e., it causes bits to be output B bits earlier in time. As used herein shifting a bit backwards in time means if the bit were originally to be output at time T, with the shift backwards in time it would occur at an earlier time $T-T_B$, where $T_B$ represent the amount of time by which the bit was shifted backwards in time. It is to be noted that the bits were effectively delayed in time by the word aligner by B bits. Thus, the total delay in time due to the word aligner and bit slipper is equal to zero for all phases of the recovered clock. It is to be noted that a total delay of 0 bits is achieved by the word aligner and bit slipper for all phases of converting serial data to parallel data by the deserializer, as the total delay is independent of these phase. More specifically, in this embodiment, the bit aligner compensates for the delay of the word aligner such that their total delay is not only constant for all phases of the recovered clock, but also equal to zero for all these phases.

As noted above, in the examples of bit slippers 400 and 500, each of multiplexers 410 to 413 and 510 to 513 is a 4-to-1 multiplexer, and each of words 420, 421, 441, 520, 521, and 541 is a 4-bit word. However, the invention is not limited to these sizes which have been selected for ease of illustration. For example, in the embodiment of FIG. 3, where N is equal to 10, each of the multiplexers in bit slipper 340 would be a 10-to-1 multiplexer and each of the words would be a 10-bit word. Also, in such an embodiment, there would be ten multiplexers in bit slipper 340.

In general, an N-bit bit slipper would have N multiplexers, each of which would be an N-to-1 multiplexer with a select signal large enough to select any of the N inputs to the multiplexer. In one embodiment, the select signal size, for select signals expressed in binary number format, is ceil ($\log_2$ N) number of digits, where ceil is the ceiling function which rounds up non-integer results to the next nearest integer. Additionally, for each cycle, the N multiplexers would be selecting bits from two adjacent N-bit words.

It is to be noted that the present invention is not limited to the specific implementation of the bit slippers illustrated and described herein. Instead, any bit slipper implementation that slips the bits to either compensate for the bit shifting of the word aligner or to ensure that the total delay of the word aligner and bit slipper is the same for all phases of serial to parallel conversion by the deserializer can be used to achieve deterministic word aligner latency.

A bit slipper that effectively delays bits in time (i.e., causes bits to be output later in time) is herein referred to as a delaying bit slipper. Bit slipper 400 is an example of a delaying bit slipper. On the other hand, a bit slipper that effectively shifts the bits backwards in time (i.e., causes bits to be output earlier in time) is herein referred to as a backing bit slipper. Bit slipper 500 is an example of a backing bit slipper.

It is also to be noted that the bit slipper solution is transparent to the design of the user logic. In other words, any logic that depended on the N-bit parallel word being in a certain format (e.g., coding words or other words with special meaning) does not need to change as a result of the bit slipping. Also, as can been seen in FIG. 3, the bit slipping is done at the last stage of processing after which the parallel word boundary itself does not matter. In other words, after bit slipper 340, parallel words are not processed other than being converted from parallel words to serial data.

Figure 6:
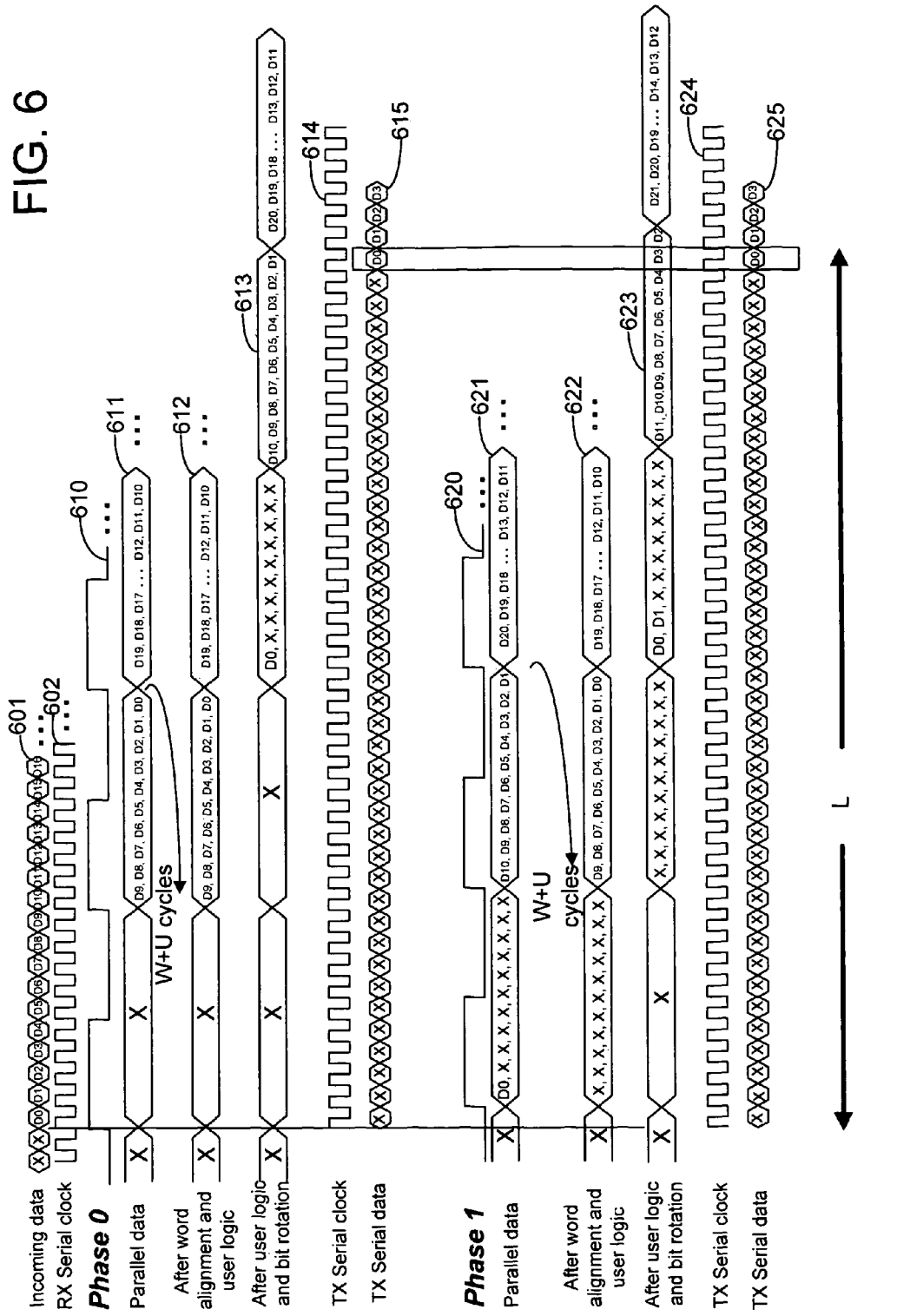
FIG. 6 is one exemplary timing diagram illustrating the relationship between signals of the system of FIG. 3.

FIG. 6 is one exemplary timing diagram illustrating the relationship between signals of the system of FIG. 3. The example of FIG. 6 is for an embodiment of system 300 where bit slipper 340 is a delaying bit slipper. More specifically, it is for an embodiment where N is equal to 10 and bit slipper 340 is a delaying bit slipper that is a 10-bit bit slipper. In FIG. 6, signals 601 and 602 represent the incoming serial data and receiver serial clock, respectively. Signals 610 to 615 represent the signals in the case of phase 0, whereas signals 620 to 625 represent the signals in the case of phase 1.

Signals 610 and 611 respectively represent the parallel clock (i.e., the recovered clock) and parallel data output by the deserializer for phase 0. Signal 612 represents parallel data 611 after word alignment and user logic processing. Signal 612 appears W+U cycles after signal 611, where W represents the number of cycles for processing parallel data 611 in the word aligner and U represents the number of cycles for processing the output of the word aligner by user logic. Signal 613 represents the parallel data after bit slipping, which for phase 0 is equal to nine bits. It is to be noted that the select signal used in the bit slipper is equal to N−B−1, where N is equal to 10 and, for phase 0, B is equal to 0. As noted above, for a delaying bit slipper, such as that of FIG. 4, the total delay of the word aligner and the bit slipper is equal to N−1 for all phases, which is equal to 9 when N is equal to 10. As the delay by the word aligner for phase 0 is zero bits, the bit slipper provides the remainder of the 9 bit delay. Thus, the bit slipper provides the entire 9 bit delay. Signals 614 and 615 respectively represent the transmitter serial clock and transmitter serial data in the case of phase 0.

Similarly, signals 620 and 621 respectively represent the parallel clock (i.e., the recovered clock) and parallel data output by the deserializer for phase 1. Signal 622 represents parallel data 621 after word alignment and user logic processing. Signal 622 appears W+U cycles after signal 621, where W represents the number of cycles for processing parallel data 621 in the word aligner and U represents the number of cycles for processing the output of the word aligner by user logic. Signal 623 represents the parallel data after bit slipping, which for phase 1 is equal to eight bits. As noted above, the select signal used in the bit slipper is equal to N−B−1, where N is equal to 10 and, for phase 1, B is equal to 1. As noted above, for a delaying bit slipper, such as that of FIG. 4, the total delay of the word aligner and the bit slipper is equal to N−1 for all phases, which is equal to 9 when N is equal to 10. As the delay by the word aligner for phase 1 is one bit, the bit slipper provides the remainder of the 9 bit delay. Thus, the bit slipper provides 8 bits of delay. Signals 624 and 625 respectively represent the transmitter serial clock and transmitter serial data in the case of phase 1.

For both phase 0 and phase 1, there is a fixed and known latency L (which may be expressed in UI or time) between D0 being input into system 300 as a serial data bit and D0 being output from system 300 as a serial data bit. It is to be noted that although this fixed and known latency L is shown for only phases 0 and 1 in FIG. 6, it applies to all other phases. The known and fixed latency L is achieved for all phases, provided that the combination of the word aligner and bit slipper provide a combined constant delay (e.g., N−1 as explained above for all phases) and provided that other latencies (e.g., the receiver-to-transmitter transfer latency is known). Again, it is assumed that other latency uncertainties (e.g., wire latency uncertainty) are insignificant and are therefore ignored.

Figure 7:
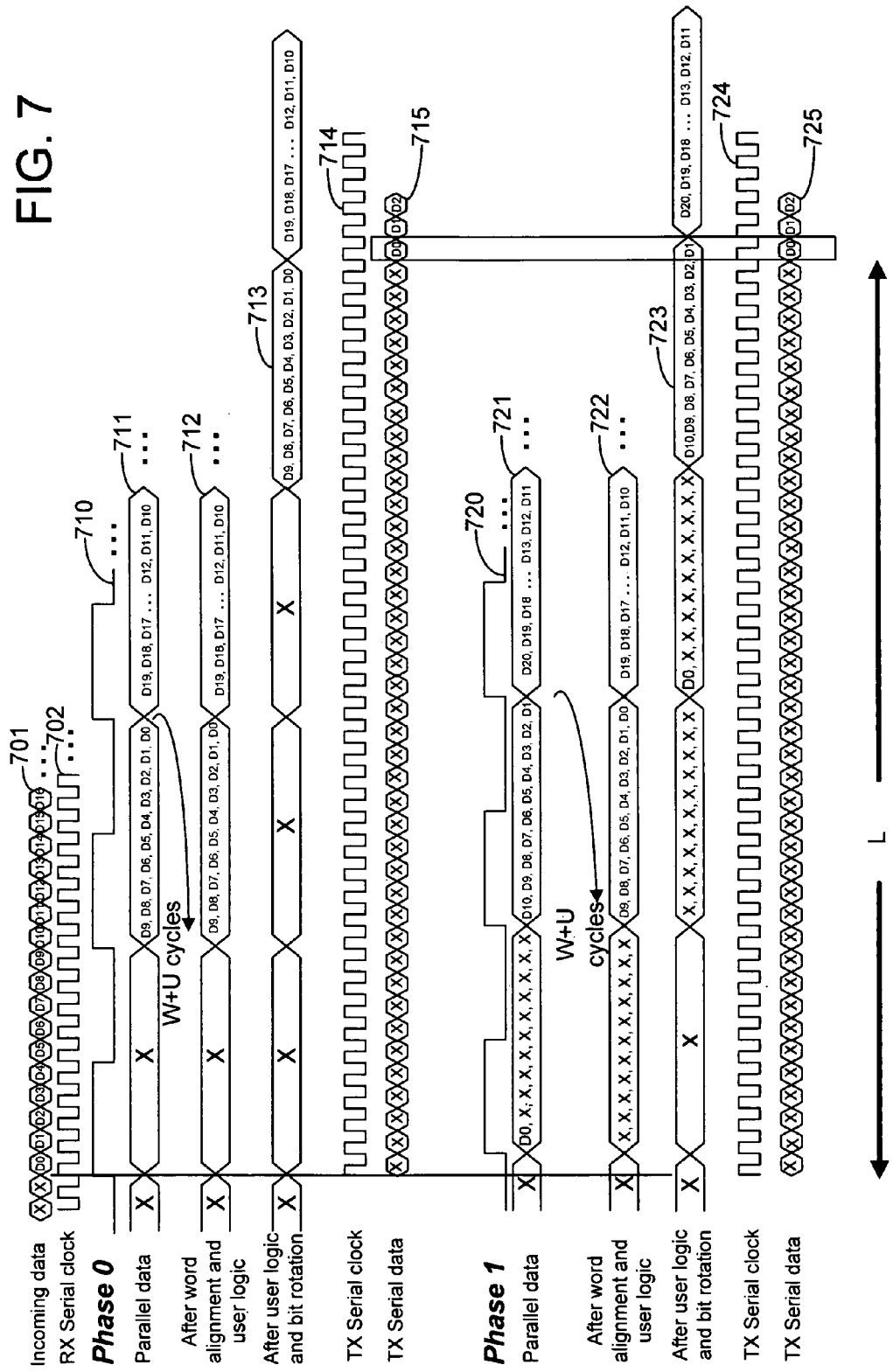
FIG. 7 is another exemplary timing diagram illustrating the relationship between signals of the system of FIG. 3.

FIG. 7 is another exemplary timing diagram illustrating the relationship between signals of the system of FIG. 3. The example of FIG. 7 is for a case where bit slipper 340 used is system 300 is a backing bit slipper. More specifically, it is for an embodiment where N is equal to 10 and bit slipper 340 is a backing bit slipper that is a 10-bit bit slipper. In FIG. 7, signals 701 and 702 represent the incoming serial data and receiver serial clock, respectively. Signals 710 to 715 represent the signals in the case of phase 0, whereas signals 720 to 725 represent the signals in the case of phase 1.

Signals 710 and 711 respectively represent the parallel clock (i.e., the recovered clock) and parallel data output by the deserializer for phase 0. Signal 712 represents parallel data 711 after word alignment and user logic processing. Signal 712 appears W+U cycles after signal 711, where W represents the number of cycles for processing parallel data 711 in the word aligner and U represents the number of cycles for processing the output of the word aligner by user logic. Signal 713 represents the parallel data after bit slipping, which for phase 0 is equal to 0 bits. It is to be noted that the select signal used in the bit slipper is equal to B, where for phase 0, B is equal to 0. As noted above, a backing bit slipper, such as that of FIG. 5, slips bits backwards in time to compensate for the delay caused by the word aligner, such that the total delay of the word aligner and the bit slipper is equal to zero. As the delay by the word aligner for phase 0 is zero bits, the bit slipper slip bits backwards in time by zero bits such that the total delay of the word aligner and the bit slipper is zero bits. Signals 714 and 715 respectively represent the transmitter serial clock and transmitter serial data in the case of phase 0.

Similarly, signals 720 and 721 respectively represent the parallel clock (i.e., the recovered clock) and parallel data output by the deserializer for phase 1. Signal 722 represents parallel data 721 after word alignment and user logic processing. Signal 722 appears W+U cycles after signal 721, where W represents the number of cycles for processing parallel data 721 in the word aligner and U represents the number of cycles for processing the output of the word aligner by user logic. Signal 723 represents the parallel data after bit slipping, which for phase 1 is equal to one bit, and for a backing bit slipper is a shift of 1 bit backwards in time. As noted above, the select signal used in the bit slipper is equal to B, where for phase 1, B is equal to 1. As noted above, a backing bit slipper, such as that of FIG. 5, slips bits backwards in time to compensate for the delay caused by the word aligner, such that the total delay of the word aligner and the bit slipper is equal to zero bits. As the delay by the word aligner for phase 1 is one bit, the bit slipper slips bits backwards in time by one bit such that the total delay of the word aligner and the bit slipper is zero bits. Signals 724 and 725 respectively represent the transmitter serial clock and transmitter serial data in the case of phase 1.

For both phase 0 and phase 1, there is a fixed and known latency L (which may be expressed in UI or time) between D0 being input into system 300 as a serial data bit and D0 being output from system 300 as a serial data bit. It is to be noted that although this fixed and known latency L is shown for only phases 0 and 1 in FIG. 7, it applies to all other phases. The known and fixed latency L is achieved for all phases, provided that the bit slipper compensates for the bit shifts caused by the word aligner such that the total bit shifting caused by the word aligner and the bit slipper is equal to zero and provided that other latencies (e.g., the receiver-to-transmitter transfer latency is known). Again, it is assumed that other latency uncertainties (e.g., wire latency uncertainty) are insignificant and are therefore ignored.

Those skilled in the art would appreciate that in the above descriptions of FIGS. 4 to 7, word level delays, i.e., delays representing an entire word or words, in the bit slippers are ignored. The latency of word level delays is known and, therefore, they do not add any latency uncertainty. For example, in FIG. 7, for phase 0, there is a two word cycle delay between signals 712 and 713, which represents the two cycles of delay between receiving an input word and outputting an output word by the backing bit slipper.

Figure 8:
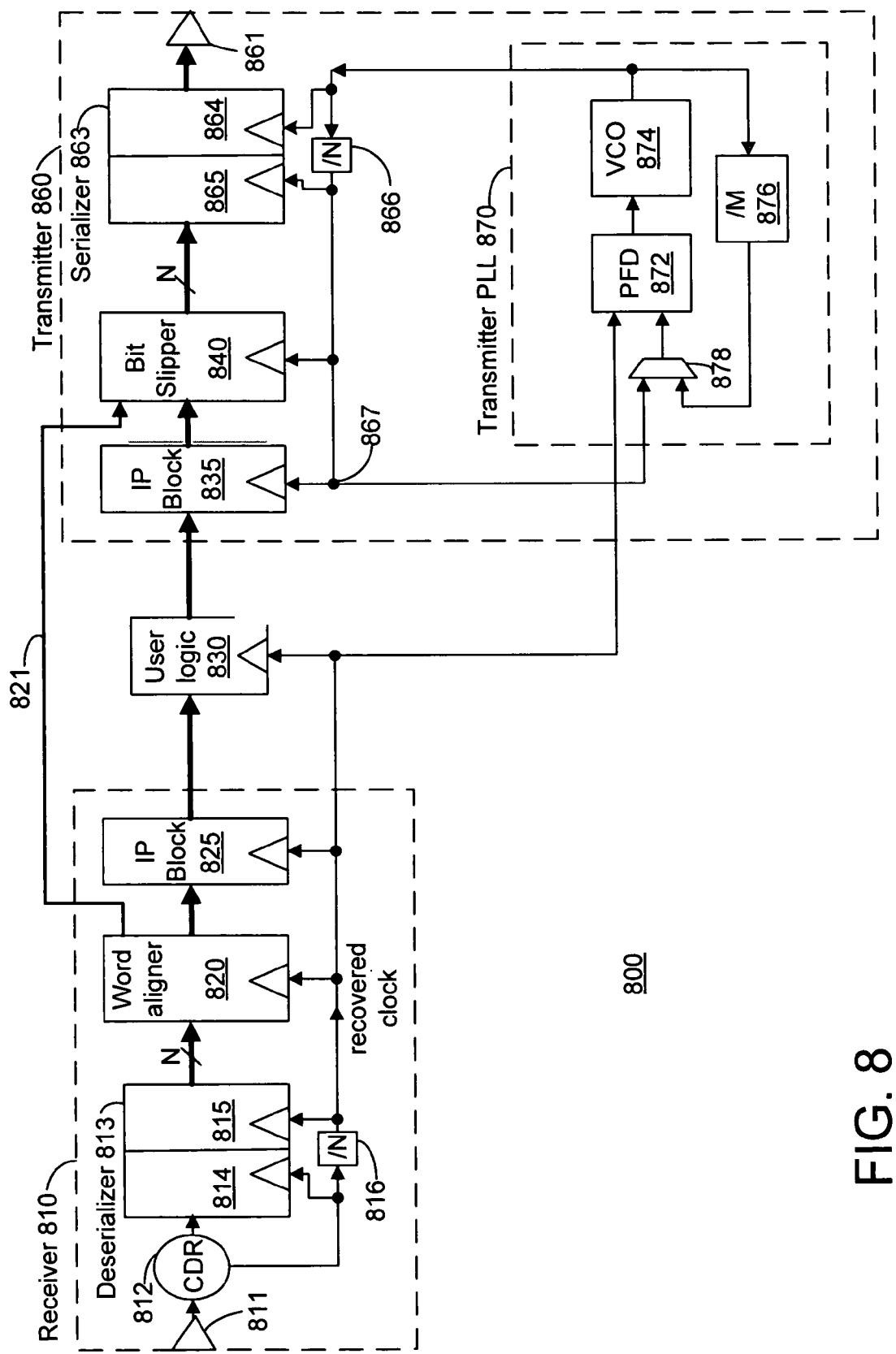
FIG. 8 is a block diagram illustrating another embodiment of the system of the present invention.

FIG. 8 is a block diagram illustrating another embodiment of the system of the present invention. In FIG. 8, system 800 includes receiver 810, user logic 830, and transmitter 860. System 800 may be a PLD or any other circuit or device that includes a user logic, a receiver, and a transmitter. In one embodiment of system 800, user logic 830 is part of the PLD core.

With the exceptions noted below, system 800 is similar to system 300 (shown in FIG. 3). Components and signals in system 800 that serve similar functions as their counterparts in system 300 have been designated with reference numbers that differ from those of their counterparts by five hundred. For example, user logic 830 in system 800 corresponds to user logic 330 in system 300. As system 800 is similar to system 300 and operates in a similar fashion, it will not be described in greater detail herein, except to note some of its differences relative to system 300.

Like receiver 310, receiver 810 includes input I/F 811, CDR unit 812, deserializer 813 and divider 816. However, in addition to these elements, receiver 810, unlike receiver 310, also includes word aligner 820 and intellectual property (IP) block 825. Similarly, transmitter 860, like transmitter 360, includes output I/F 861, serializer 863, divider 866, and PLL 870. However, in addition to these elements, transmitter 810, unlike transmitter 310, also includes IP block 835 and bit slipper 840. PLL 870 includes PFD 872, VCO 874, divider 876, and multiplexer 878 connected as shown in FIG. 8. In one embodiment, divider 876 is an M divider, where M is as defined above. Also, unlike bit slipper 340, bit slipper 840 is clocked by the transmitter parallel clock instead of the recovered clock.

In one embodiment, input I/F 811, CDR unit 812, deserializer 813 and divider 816 are part of the physical media attachment sublayer (PMA) of system 800. Similarly, in one embodiment, word aligner 820 and IP 825 are part of the physical coding sublayer (PCS) of system 800. Also in one embodiment, output I/F 861, serializer 863, divider 866, and PLL 870, are part of the PMA of system 800, while IP 835 and bit slipper 840 are part of the PCS of system 800.

In another embodiment, receiver 810 may be defined to include input I/F 811, CDR unit 812, deserializer 813, and divider 816, but not word aligner 820 and IP block 825. Similarly, in another embodiment, transmitter 860 may be defined to include output I/F 861, serializer 863, divider 866, and PLL 870, but not IP block 835 and bit slipper 840. In an embodiment where receiver 810 and transmitter 860 are as defined above in this paragraph, word aligner 820, IP block 825, user logic 830, IP block 835, and bit slipper 840 would be part of the system core, e.g., a PLD core.

In one embodiment IP block 825 is a decoder that converts words received from word aligner 820 to another format for processing by user logic 830. Similarly, in one embodiment, IP block 835 is an encoder that converts words output by user logic 830 to a format for processing by bit slipper 840. As a result, IP blocks 825 and 835 expect specific patterns (i.e., size and alignment) of parallel words. In one embodiment IP block 825 is an 8B10B decoder, which receives 10 bit words and converts them into 8 bit words, and IP block 835 is an 8B10B encoder, which receives 8 bit words and converts them into 10 bit words.

It is to be noted that in one embodiment, IP blocks 825 and 835 are embedded IP logic blocks that perform hard logic implementations of the encoding and decoding discussed above. It is also to be noted that, in an embodiment of the present invention that does not include IP blocks, such as IP blocks 825 and 835, e.g., system 300, the function of those IP blocks may be performed by the user logic. This implementation of the IP functions is referred to as a soft logic implementation.

Similar to system 300, in one embodiment of system 800, when using a bit slipper to eliminate the word aligner latency uncertainty, one may choose not to eliminate the receiver-to-transmitter transfer latency uncertainty. In such a case, the new feedback path would not be used. Instead, the old feedback loop would be used, in which case, a phase crossing FIFO may be used to allow for transferring from the receiver parallel clock to the transmitter parallel clock.

In another embodiment of system 800, when using the new feedback path to eliminate the receiver-to-transmitter transfer latency uncertainty, one may choose not to eliminate the word aligner latency uncertainty. In such a case, a bit slipper would not be used.

Embodiments of the present invention, such as systems 300 or 800, may be used to meet protocols regarding bit-level latency uncertainty, such as CPRI protocols. For example, they may be used to address CPRI protocols in wireless systems that are single-hop (i.e., have a point-to point topology) or multi-hop (i.e., have a chain topology).

As noted above, in one embodiment of system 300, word aligner 320, user logic 330 and bit slipper 340 are part of the PLD core. Similarly, in one embodiment of system 800, user logic 830 is part of the PLD core. In such embodiments, systems 300 and 800 may be a PLD.

PLDs (also sometimes referred to as complex PLDs (CPLDs), programmable array logic (PALs), programmable logic arrays (PLAs), field PLAs (FPLAs), erasable PLDs (EPLDs), electrically erasable PLDs (EEPLDs), logic cell arrays (LCAs), field programmable gate arrays (FPGAs), or by other names) provide the advantages of fixed integrated circuits (ICs) with the flexibility of custom ICs. Such devices typically provide an "off the shelf" device having at least a portion that can be programmed to meet a user's specific needs. Application specific integrated circuits (ASICs) have traditionally been fixed ICs. However, it is possible to provide an ASIC that has a portion or portions that are programmable. Thus, it is possible for an IC device to have qualities of both an ASIC and a PLD. The term PLD as used herein will be considered broad enough to include such devices.

PLDs have configuration elements that may be programmed or reprogrammed. Configuration elements may be realized as RAM bits, flip-flops, electronically erasable programmable read-only memory (EEPROM) cells, or other memory elements. Placing new data into the configuration elements programs or reprograms the PLD's logic functions and associated routing pathways. Configuration elements that are field programmable are often implemented as RAM cells (sometimes referred to a "configuration RAM" (CRAM)). However, many types of configurable elements may be used including static or dynamic RAM (SRAM or DRAM), electrically erasable read-only memory (EEROM), flash, fuse, and anti-fuse programmable connections. The programming of configuration elements could also be implemented through mask programming during fabrication of the device. While mask programming may have disadvantages relative to some of the field programmable options already listed, it may be useful in certain high volume applications.

Figure 9:
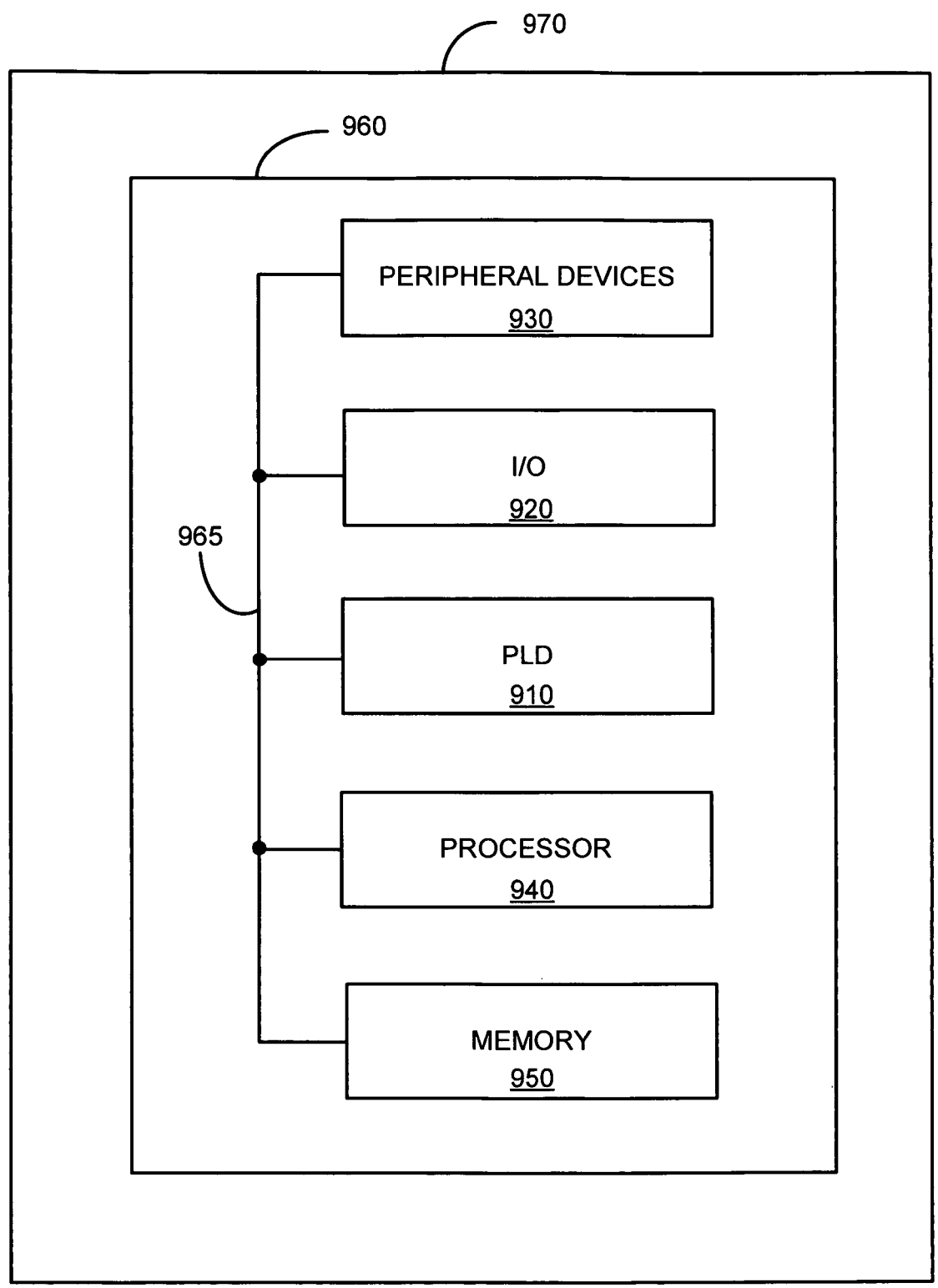
FIG. 9 illustrates an exemplary data processing system in which a PLD in accordance with the present invention might be implemented.

FIG. 9 illustrates an exemplary data processing system in which a PLD in accordance with the present invention might be implemented. In FIG. 9, data processing system 900, among other things, includes PLD 910. In one embodiment, PLD 910 may embody a system of the present invention (such as system 300 or 800, shown in FIG. 3 or 8, respectively). Data processing system 900 may include one or more of the following components: processor. 940, memory 950, input/output (I/O) circuitry 920, and peripheral devices 930. These components are coupled together by system bus 965 and are populated on circuit board 960 which is contained in end-user system 970. A data processing system such as system 900 may include a single end-user system such as end-user system 970 or may include a plurality of systems working together as a data processing system.

System 900 can be used in a wide variety of applications, such as computer networking, data networking, instrumentation, video processing, digital signal processing (DSP), or any other application where the advantage of using programmable or reprogrammable logic is desirable. PLD 910 can be used to perform a variety of different logic functions. For example, PLD 910 can be configured as a processor or controller that works in cooperation with processor 940 (or, in alternative embodiments, a PLD might itself act as the sole system processor). PLD 910 may also be used as an arbiter for arbitrating access to a shared resource in system 900. In yet another example, PLD 910 can be configured as an interface between processor 940 and one of the other components in system 900. It should be noted that system 900 is only exemplary.

In one embodiment, system 900 is a digital system. As used herein a digital system is not intended to be limited to a purely digital system, but also encompasses hybrid systems that include both digital and analog subsystems.

While the present invention has been particularly described with respect to the illustrated embodiments, it will be appreciated that various alterations, modifications and adaptations may be made based on the present disclosure, and are intended to be within the scope of the present invention. While the invention has been described in connection with what are presently considered to be the most practical and preferred embodiments, it is to be understood that the present invention is not limited to the disclosed embodiments but, on the contrary, is intended to cover various modifications and equivalent arrangements included within the scope of the appended claims.

What is claimed is:

1. A transceiver system comprising:
   a word aligner, wherein each word of a plurality of words aligned by the word aligner has a plurality of bits and the word aligner aligns the plurality of words to a word boundary; and
   a bit slipper coupled to the word aligner;
   wherein the bit slipper receives information regarding word alignment from the word aligner, further wherein the bit slipper slips bits in such a way so that total delay due to word alignment by the word aligner and bit slipping by the bit slipper is constant for all phases of a recovered clock signal.

2. The transceiver system of claim 1, wherein the total delay is zero for all phases of the recovered clock signal.

3. The transceiver system of claim 1, wherein the transceiver system has a receiver to transmitter transfer latency uncertainty of zero.

4. The transceiver system of claim 1 further comprising:
   a transmitter phase locked loop (PLL) including a first feedback path and a second feedback path.

5. The transceiver system of claim 4, wherein the transmitter PLL includes a multiplexer coupled to a phase frequency detector, wherein the multiplexer selects between a first clock signal from a first divider and a second clock signal from a second divider to provide to the phase frequency detector.

6. The transceiver system of claim 5, wherein the first feedback path includes the first divider and the second feedback path includes the second divider, further wherein the first divider is a transmitter divider.

7. The transceiver system of claim 6, wherein the phase frequency detector receives a reference clock signal that is a delayed version of the recovered clock signal.

8. The transceiver system of claim 1 further comprising:
   a user logic coupled to the word aligner and the bit slipper.

9. The transceiver system of claim 8 further comprising:
   a first IP block coupled to the word aligner and the user logic, wherein the first IP block converts words received from the word aligner to another format for processing by the user logic; and a second IP block coupled to the user logic and the bit slipper, wherein the second IP block converts words output by the user logic to a format for processing by the bit slipper.

10. A programmable logic device including the transceiver system of claim 1.

11. A digital system comprising a programmable logic device including the transceiver system of claim 1.

12. The transceiver system of claim 1, wherein the total delay is a total bit level delay caused by bit shifting by the word aligner and bit slipping by the bit slipper, wherein the total bit level delay excludes word level delays, if any, and wherein the phases of the recovered clock signal are bit level phases of the recovered clock signal.

13. A method comprising:
   aligning words to a desired word boundary, wherein each of the words has a plurality of bits;
   receiving from a word aligner, by a bit slipper, information regarding the aligning; and
   slipping bits of the words, wherein total delay due to the aligning and the slipping is constant for all phases of a recovered clock signal,
   wherein the aligning and the slipping are performed by a transceiver system.

14. The method of claim 13, wherein
   the slipping bits comprises slipping bits of the words to compensate for bit shifting by the aligning, wherein total delay due to the aligning and the slipping is zero for all phases of the recovered clock signal.

15. The method of claim 13 further comprising:
   selecting between a first clock signal from a first divider in a first feedback path of a transmitter phase locked loop (PLL) and a second clock signal from a second divider in a second feedback path of the transmitter PLL to provide to a phase frequency detector of the transmitter PLL; and
   providing to the phase frequency detector a reference clock signal that is a delayed version of the recovered clock signal.

16. The method of claim 15 further comprising:
   using a decoding intellectual property (IP) block to convert words received from the word aligner to another format for processing by a user logic; and
   using an encoding IP block to convert words output by the user logic to a format for processing by the bit slipper.

17. A transceiver system comprising:
   a receiver including a deserializer that converts serial data to parallel data, wherein the receiver further provides a recovered clock signal;
   a word aligner coupled to the receiver, wherein the word aligner aligns parallel words in the parallel data to a desired word boundary;
   a user logic coupled to the word aligner;
   a bit slipper coupled to the user logic and the word aligner, wherein the bit slipper receives information regarding word alignment from the word aligner, further wherein the bit slipper slips bits in such a way so that total delay due to word alignment by the word aligner and bit slipping by the bit slipper is constant for all phases of a recovered clock; and
   a transmitter coupled to the bit slipper, wherein the transmitter comprises:
     a serializer that converts the parallel data to serial data; and
     a transmitter phase locked loop (PLL) including a first feedback path having a first divider, a second feedback path having a second divider, a phase frequency detector, and a multiplexer coupled to the first feedback path, the second feedback path, and the phase frequency detector, wherein the first divider is a transmitter divider, the phase frequency detector receives a reference clock signal that is a delayed version of the recovered clock signal, and the multiplexer selects between a first clock signal from the first divider and a second clock signal from the second divider to provide to the phase frequency detector;
   wherein the transceiver system has a word aligner latency uncertainty of zero and a receiver to transmitter transfer latency uncertainty of zero.

18. The transceiver system of claim 17, wherein the bit slipper includes a first plurality of registers, a second plurality of registers coupled to the first plurality of registers, and a plurality of multiplexers coupled to the first and second plurality of registers, wherein each multiplexer of the plurality of multiplexers is coupled to one or more registers of the first plurality of registers, one or more registers of the second plurality of registers, or one or more registers of both the first and second plurality of registers.

19. The transceiver system of claim 17 further comprising:
a first IP block coupled to the word aligner and the user logic, wherein the first IP block converts words received from the word aligner to another format for processing by the user logic; and
a second IP block coupled to the user logic and the bit slipper, wherein the second IP block converts words output by the user logic to a format for processing by the bit slipper.

20. A programmable logic device including the transceiver system of claim 17.

21. A digital system comprising a programmable logic device including the transceiver system of claim 17.

22. A transceiver system comprising:
a transmitter comprising:
a phase locked loop (PLL) including a first divider and a phase frequency detector, wherein the first divider feeds a first parallel clock signal to the phase frequency detector and a register of the transmitter;
a word aligner coupled to the transmitter, wherein each word of a plurality of words aligned by the word aligner has a plurality of bits and the word aligner aligns the plurality of words to a word boundary; and
a bit slipper that receives information from the word aligner regarding word alignment,
wherein total delay due to word alignment and bit slipping in the transceiver system is constant for all phases of a recovered clock signal.

23. The transceiver system of claim 22, wherein the transceiver system has a receiver to transmitter transfer latency uncertainty of zero.

24. The transceiver system of claim 23, wherein the PLL includes a first feedback path, a second feedback path, and a multiplexer coupled to the first and second feedback paths and the phase frequency detector, wherein the multiplexer selects between the first parallel clock signal from the first divider and a second clock signal from a second divider to provide to the phase frequency detector.

25. The transceiver system of claim 24, wherein the first feedback path includes the first divider and the second feedback path includes the second divider, further wherein the first divider is a transmitter divider.

26. The transceiver system of claim 25, wherein the phase frequency detector receives a reference clock signal that is a delayed version of the recovered clock signal.

27. The transceiver system of claim 26 further comprising:
an IP block coupled to the bit slipper, wherein the IP block converts words to a format for processing by the bit slipper.

28. A programmable logic device including the transceiver system of claim 22.

29. A digital system comprising a programmable logic device including the transceiver system of claim 22.

30. A method comprising:
providing a first parallel clock signal from a first divider of a transmitter phase locked loop (PLL) to a phase frequency detector of the transmitter PLL and a register of a transmitter that includes the transmitter PLL;
aligning words to a desired word boundary, wherein each of the words has a plurality of bits;
receiving from a word aligner, by a bit slipper, information regarding the aligning; and
slipping bits of the words, wherein total delay due to the aligning and the slipping is constant for all phases of a recovered clock signal.

31. The method of claim 30, wherein the transceiving has a receiver to transmitter transfer latency uncertainty of zero.

32. The method of claim 31 further comprising:
selecting between the first parallel clock signal from the first divider of the transmitter PLL and a second parallel clock signal from a second divider of the transmitter PLL to provide to the phase frequency detector of the transmitter PLL; and
providing the phase frequency detector a reference clock signal that is a delayed version of the recovered clock signal;
wherein the first divider is on a first feedback path of the transmitter PLL and the second divider is on a second feedback path of the transmitter PLL.

33. The method of claim 32 further comprising:
using an intellectual property (IP) block to convert words to a format for processing by the bit slipper.

* * * * *